United States Patent
Harayama (10) Patent No.: US 9,722,219 B2
(45) Date of Patent: Aug. 1, 2017

(54) BATTERY, ASSEMBLED BATTERY, AND MOUNTING DEVICE

(75) Inventor: Takashi Harayama, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 296 days.

(21) Appl. No.: 14/241,260

(22) PCT Filed: Aug. 30, 2011

(86) PCT No.: PCT/JP2011/004831
§ 371 (c)(1),
(2), (4) Date: Feb. 26, 2014

(87) PCT Pub. No.: WO2013/030880
PCT Pub. Date: Mar. 7, 2013

(65) Prior Publication Data
US 2015/0017501 A1 Jan. 15, 2015

(51) Int. Cl.
*H01M 2/06* (2006.01)
*H01M 2/26* (2006.01)
(Continued)

(52) U.S. Cl.
CPC .......... *H01M 2/06* (2013.01); *H01M 2/0202* (2013.01); *H01M 2/0237* (2013.01);
(Continued)

(58) Field of Classification Search
None
See application file for complete search history.

(56) References Cited

U.S. PATENT DOCUMENTS

| 2010/0047686 A1* | 2/2010 | Tsuchiya | H01M 2/202 429/178 |
| 2011/0045345 A1* | 2/2011 | Tsuchiya | H01M 2/22 429/179 |

(Continued)

FOREIGN PATENT DOCUMENTS

| CN | 101578723 | 11/2009 |
| JP | 2002-175795 | 6/2002 |

(Continued)

OTHER PUBLICATIONS

U.S. Appl. No. 14/241,808, national phase entry on Feb. 27, 2014.

*Primary Examiner* — Lucas J. O'Donnell
(74) *Attorney, Agent, or Firm* — Finnegan, Henderson, Farabow, Garrett & Dunner, LLP (57) ABSTRACT

A battery includes a bottomed case of box shape housing a power-generating element, a lid component for the case, a terminal electrode provided outside the case and extending in the direction of the thickness of the lid component, a take-out electrode passing through the lid component, provided for taking out an electric power of the power-generating element to the outside of the case, and disposed at a position different from that of the terminal electrode within a plane including the lid component, and a connecting member connecting the terminal electrode and the take-out electrode and including a thinner portion allowing bending of the connecting member in response to an external force applied to the terminal electrode in the direction of the thickness of the lid component.

8 Claims, 8 Drawing Sheets

(51) Int. Cl.
*H01M 2/30* (2006.01)
*H01M 2/02* (2006.01)
*H01M 2/10* (2006.01)

(52) U.S. Cl.
CPC ....... *H01M 2/1022* (2013.01); *H01M 2/1077* (2013.01); *H01M 2/26* (2013.01); *H01M 2/30* (2013.01); *H01M 2220/20* (2013.01); *H01M 2220/30* (2013.01)

(56) References Cited

U.S. PATENT DOCUMENTS

2011/0076553 A1* 3/2011 Kameda ................ H01M 2/043 429/181
2012/0264005 A1 10/2012 Tsuchiya et al.

FOREIGN PATENT DOCUMENTS

| | | |
|---|---|---|
| JP | 2010-97822 | 4/2010 |
| JP | 2011-165436 | 8/2011 |
| JP | 2013-48047 | 3/2013 |
| WO | WO 2008/084883 A2 | 7/2008 |
| WO | WO 2013/030869 | 3/2013 |

* cited by examiner

BATTERY, ASSEMBLED BATTERY, AND MOUNTING DEVICE

CROSS-REFERENCE TO RELATED APPLICATIONS

This application is a national phase application of International Application No. PCT/JP2011/004831, filed Aug. 30, 2011, the content of which is incorporated herein by reference.

TECHNICAL FIELD

The present invention relates to a mounting structure for a terminal electrode to be attached to a battery and the like.

BACKGROUND ART

An assembled battery including a plurality of cells connected through a bus bar is known as a battery having a higher capacity and a higher output as compared with a battery for a portable device such as for an electrically powered tool driving power source and for a vehicle driving power source. The bus bar is fixed by fastening a nut to a terminal electrode protruding from the cell. Patent Document 1 has disclosed a battery having a lid plate having a terminal lead-out through hole bored therein and having a rotation preventing portion formed on an upper face to protrude upward, a take-out electrode having a lower portion inserted into a battery container through the terminal lead-out through hole and connected to metal foil of a power-generating element, the take-out electrode being sealed and secured to the lid plate through an insulating sealing agent, a connecting electrode connected and fixed to an upper portion of the take-out electrode, and an external terminal having a bolt portion formed to protrude from a seat portion and passed through a terminal inserting hole in the connecting electrode from below, the seat portion being locked on the rotation preventing portion of the lid plate to limit the rotation of the bolt portion about its axis.

PRIOR ART DOCUMENT

Patent Document

[Patent Document 1] Japanese Patent Laid-Open No. 2010-097822

DISCLOSURE OF THE INVENTION

Problems to be Solved by the Invention

In the configuration described in Patent Document 1, however, the portion of the connecting electrode for attaching the external terminal and the portion of the connecting electrode for attaching the take-out electrode are positioned within the same plane, so that a vertical external force applied to the external terminal causes a large external force to be applied to the portion for attaching the take-out electrode. It is thus an object of the present invention to reduce such an external force applied to the portion for attaching the take-out electrode.

Means for Solving the Problems

To solve the problem, the present invention provides (2) a battery including a bottomed case of box shape housing a power-generating element, a lid component for the case, a terminal electrode provided outside the case and extending in the direction of the thickness of the lid component, a take-out electrode passing through the lid component, provided for taking out an electric power of the power-generating element to the outside of the case, and disposed at a position different from that of the terminal electrode within a plane including the lid component, and a connecting member connecting the terminal electrode and the take-out electrode and including a thinner portion allowing bending of the connecting member in response to an external force applied to the terminal electrode in the direction of the thickness of the lid component, wherein the connecting member is formed in a stepped shape having a first flat plate portion connected to the terminal electrode and a second flat plate portion positioned at a height different from that of the first flat plate portion and connected to the take-out electrode, and the thinner portion is formed in the second flat plate portion. According to the configuration of (2), an external force applied to a portion for attaching the take-out electrode can be reduced while suppressing a reduction in rigidity of the connecting member.

(3) In the configuration of (2), the thinner portion can be provided by forming a recessed portion in one of end faces of the second flat plate portion in a direction in which the terminal electrode extends, the one end face being closer to the lid component.

(4) In the configuration of (3), an insulator is sandwiched between the second flat plate portion and the lid component, the insulator has a raised portion extending into the recessed portion, and a clearance is provided between the recessed portion and the raised portion. According to the configuration of (4), the thinner portion can be bent with the point of contact between the raised portion and the recessed portion as the pivot to reduce the external force transferred to the portion for attaching the take-out electrode more effectively.

(5) In the configuration of any one of (2) to (4), the connecting member has an inclined flat plate portion connecting the first flat plate portion and the second flat plate portion, and the thinner portion can be formed in a portion of the second flat plate portion, the portion bordering on the inclined flat plate portion. According to the configuration of (5), the connecting member can be bent at the position farther from the portion for attaching the take-out electrode to the second flat plate portion, so that the external force transferred to the portion for attaching of the take-out electrode can be reduced more effectively.

(6) In the configuration of any one of (2) to (5), the terminal electrode is inserted into a bus bar, and a nut for fixing the bus bar is fastened to an outer face of the terminal electrode. This can suppress the transfer of an external force applied to the terminal electrode by the fastening of the nut to the portion for attaching the take-out electrode.

(7) In the configuration of any one of (2) to (6), the configuration further includes a negative electrode terminal electrode made of copper and a positive electrode terminal electrode made of aluminum, wherein the thinner portion can be formed only in the positive electrode terminal electrode out of the positive electrode terminal electrode and the negative electrode terminal electrode.

(8) An assembled battery may be provided by connecting a plurality of the batteries according to any one of (2) to (7).

(9) In the configuration of (8), the assembled battery may be a power source supplying a driving electric power for a motor used to run a vehicle.

(10) In the configuration of (8), the assembled battery may be a power source for driving an electrically powered tool.

(11) A mounting device having the assembled battery according to (8) mounted thereon can be provided.

Advantage of the Invention

According to the present invention, an external force applied to the portion for attaching the take-out electrode can be reduced.

MODE FOR CARRYING OUT THE INVENTION (Embodiment 1)

Figure 1:
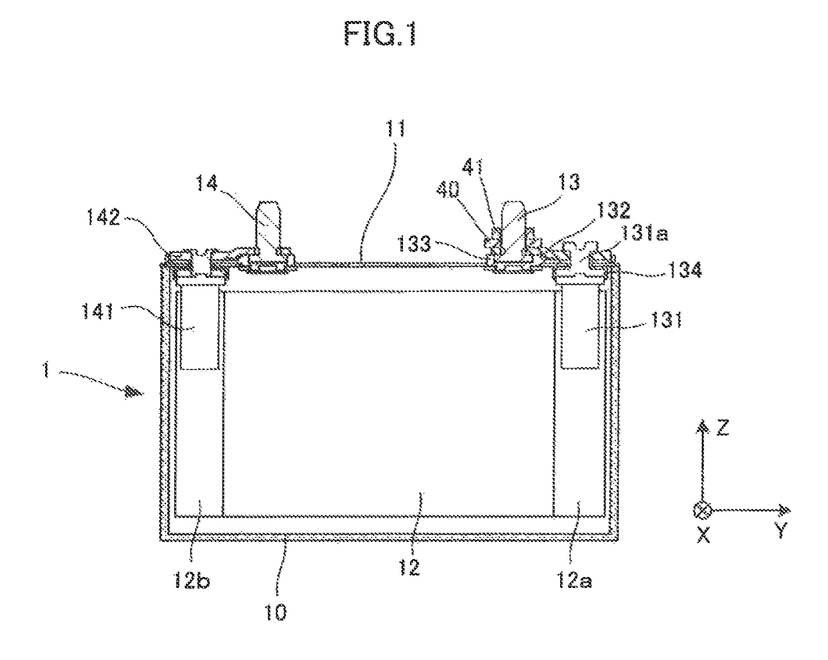
FIG. 1 is a section view of a vehicle battery.

FIG. 1 is a section view of a vehicle battery 1 according to Embodiment 1, in which an X axis, a Y axis, and a Z axis are three axes orthogonal to each other. In FIG. 1, the reference numerals of some components are omitted to simplify the drawing. The vehicle battery 1 is a nonaqueous electrolyte secondary battery. Although the nonaqueous electrolyte secondary battery is used in the present embodiment, a nickel metal hydride battery or the like may be used. The vehicle battery 1 includes a battery case 10, a lid component 11, a power-generating element 12, a terminal bolt (positive electrode) 13, and a terminal bolt (negative electrode) 14. The power-generating element 12 is housed within the battery case 10 together with an electrolytic solution.

The power-generating element 12 includes a positive electrode element, a negative electrode element, and a separator disposed between the positive electrode element and the negative electrode element. A positive electrode side uncoated portion 12a is formed at one end of the power-generating element 12 in the Y axis direction, and a negative electrode side uncoated portion 12b is formed at the other end in the Y axis direction. The positive electrode side uncoated portion 12a is electrically and mechanically connected to a collector terminal(positive electrode) 131, and the negative electrode side uncoated portion 12b is electrically and mechanically connected to a collector terminal (negative electrode) 141.

The collector terminal (positive electrode) 131 and the terminal bolt (positive electrode) 13 serving as a terminal electrode (positive electrode terminal electrode) are disposed at different positions within the plane including the lid component 11, that is, within the plane including an X-Y plane. The collector terminal (positive electrode) 131 is connected to the terminal bolt (positive electrode) 13 through a connecting member (positive electrode) 132. The collector terminal (negative electrode) 141 and the terminal bolt (negative electrode) 14 serving as a negative electrode terminal electrode are disposed at different positions within the plane including the lid component 11, that is, within the plane including the X-Y plane. The collector terminal (negative electrode) 141 is connected to the terminal bolt (negative electrode) 14 through a connecting member (negative electrode) 142. This can take out the power of the power-generating element 12 to the outside through the terminal bolt (positive electrode) 13 and the terminal bolt (negative electrode) 14.

Figure 2:
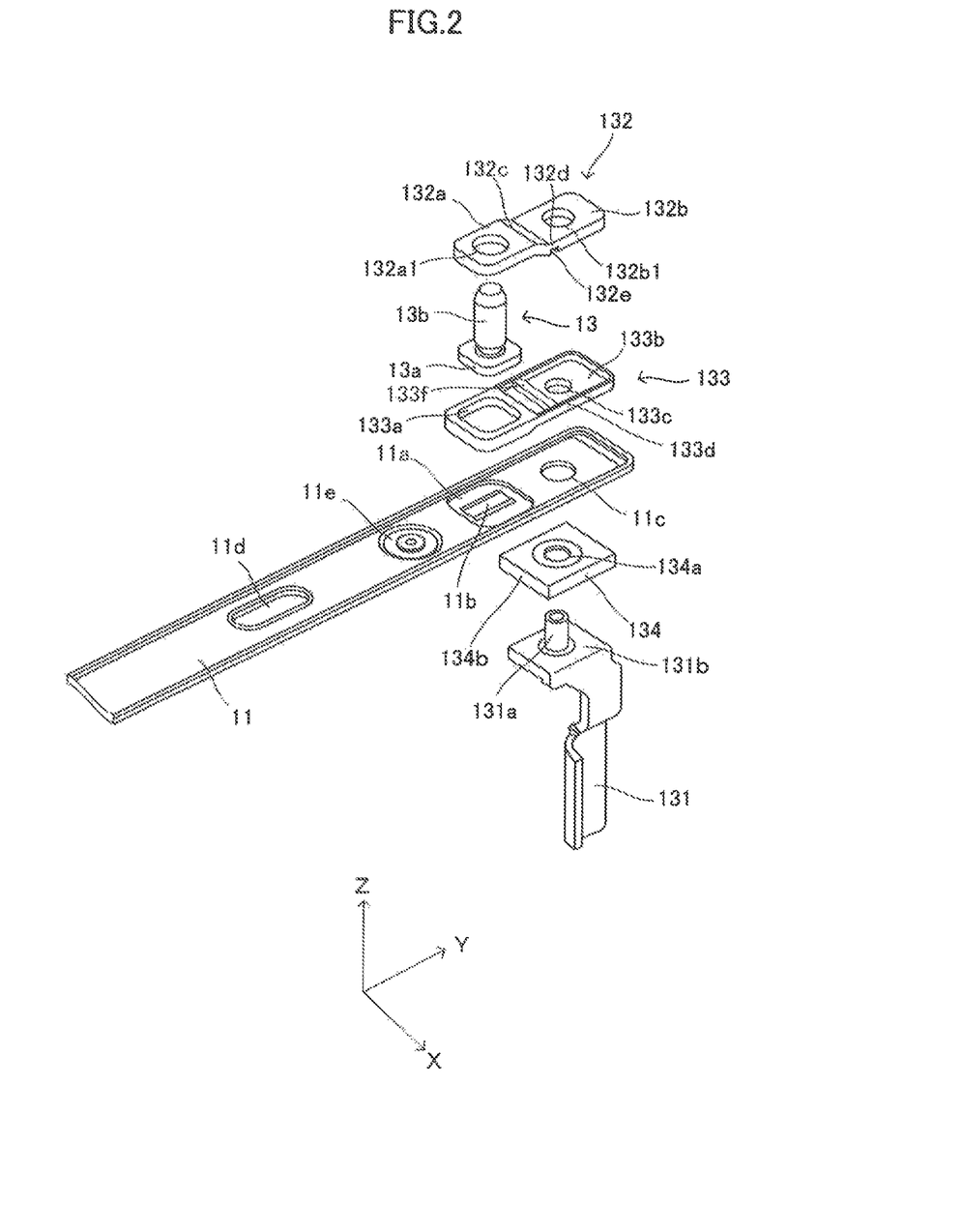
FIG. 2 is an exploded perspective view of a connecting structure for a terminal bolt (positive electrode) and a power-generating element.
Figure 3:
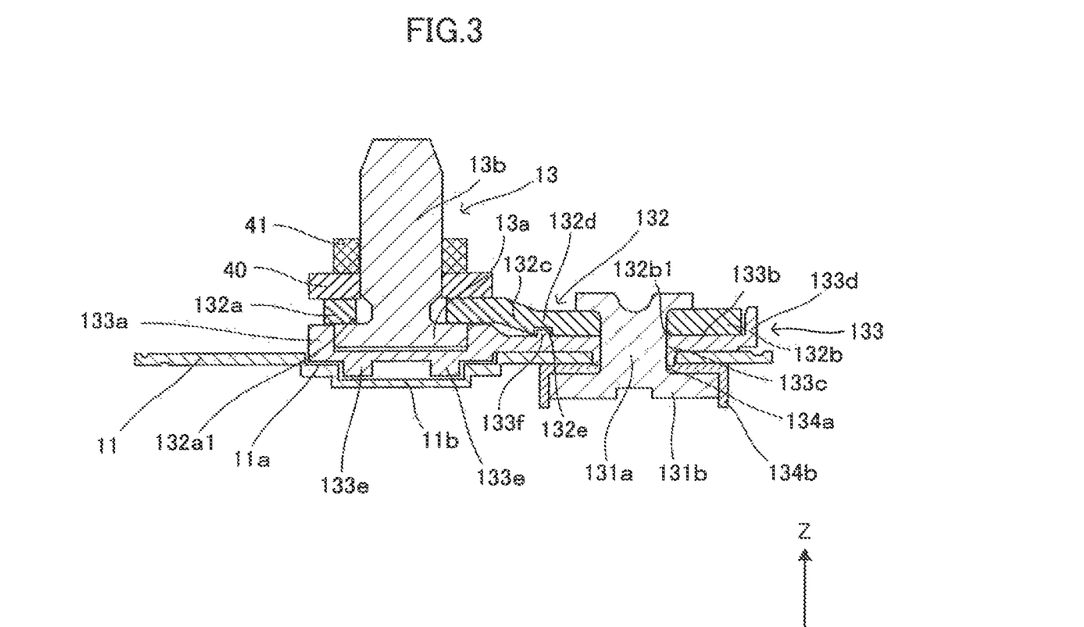
FIG. 3 is a section view of the connecting structure for the terminal bolt (positive electrode) and the power-generating element.

Description is next made of a connecting structure for the terminal bolt (positive electrode) 13 and the power-generating element 12 with reference to FIG. 1 to FIG. 3. FIG. 2 is an exploded perspective view of the connecting structure. FIG. 3 is a section view of the connecting structure. The terminal bolt (positive electrode) 13 includes a seat portion 13a and a protruding portion 13b extending from the seat portion 13a. The seat portion 13a is formed in a rectangular shape when viewed from the Z axis direction, and the four corners of the seat portion 13a are formed by curved surfaces. The protruding portion 13b has a section of circular shape in the X-Y plane and has a thread formed on its outer circumferential face.

The connecting member (positive electrode) 132 is formed in a stepped shape having a terminal fastening face 132a serving as a first flat plate portion to be connected to the terminal bolt (positive electrode) 13, a terminal fixing face 132b positioned at a height different from that of the terminal fastening face 132a and serving as a second flat plate portion to be connected to a rivet portion 131a which is part of the collector terminal (positive electrode) 131, and an inclined flat plate portion 132c connecting the terminal fastening face 132a and the terminal fixing face 132b. The terminal fastening face 132a extends within the plane including the lid component 11, that is, along the X-Y plane, and has a terminal inserting hole portion 132a1 formed at the center and passed therethrough in a plate thickness direction (Z axis direction). The terminal fixing face 132b extends within the plane including the lid component 11, that is, along the X-Y plane, and has a swaged hole portion 132b1 formed at the center and passed therethrough in the plate thickness direction (Z axis direction). The inclined flat plate portion 132c extends in a direction inclined with respect to the terminal fastening face 132a. The terminal fastening face 132a and the terminal fixing face 132b overlap each other when viewed from the Y axis direction. The connecting member (positive electrode) 132 may be formed by stamping of a metal plate. The metal plate may be made of aluminum.

The terminal fixing face 132b has a thinner portion 132d formed to allow bending of the connecting member (positive electrode) 132 when the terminal bolt (positive electrode) 13 undergoes an external force in a thickness direction (Z axis direction) of the lid component 11.

The thinner portion 132d is provided by forming a recessed portion 132e in one of the end faces of the terminal fixing face 132b in the Z axis direction that is closer to the lid component 11 (a face opposite to an insulator 133).

The protruding portion 13b of the terminal bolt (positive electrode) 13 is inserted into the terminal inserting hole portion 132a1 of the terminal fastening face 132a. The protruding portion 13b is inserted into a through hole in a bus bar 40 and is fastened by a fastening nut 41. In FIG. 2, the bus bar 40 and the fastening nut 41 are omitted to simplify the drawing. The bus bar 40 is electrically connected to the terminal bolt (positive electrode) 13 in this manner. The bus bar 40 is connected to a terminal bolt (negative electrode) of another adjacent battery, not shown. The bus bar 40 is used to connect a plurality of vehicle batteries 1 to constitute an assembled battery. The assembled battery can be utilized as the motive power source for a motor used to run the vehicle. The bus bar 40 may be used to connect a plurality of vehicle batteries 1 in parallel.

The insulator 133 serving as an insulating element has a seat housing portion 133a formed by depressing part of the insulator 133 and a terminal supporting portion 133b supporting the terminal fixing face 132b. The insulator 133 is sandwiched between the lid component 11 and the terminal bolt (positive electrode) 13. This can prevent a short circuit between the terminal bolt (positive electrode) 13 and the terminal bolt (negative electrode) 14 through the lid component 11. The insulator 133 may be made of an insulating material such as resin (for example, PPS resin). The insulator 133 may be integrally formed with injection molding.

The seat housing portion 133a is formed to surround the seat portion 13a. The seat portion 13a overlaps with a thicker portion of the insulator 133 when viewed from a horizontal direction (Y axis direction). The inner bottom face of the seat housing portion 133a is positioned below the support face of the terminal supporting portion 133b. Thus, the thicker portion of the insulator 133 can receive a horizontal force applied to the wall face of the seat housing portion 133a from the seat portion 13a of the terminal bolt (positive electrode) 13 during the running of the vehicle. This can suppress bending of the wall portion of the seat housing portion 133a to prevent any displacement of the terminal bolt (positive electrode) 13.

The seat housing portion 133a surrounding the seat portion 13a of the terminal bolt (positive electrode) 13 can suppress any horizontal displacement of the seat portion 13a. This can prevent contact between the terminal bolt (positive electrode) 13 and the lid component 11 from causing a short circuit in the vehicle battery 1. In addition, the seat portion 13a of the terminal bolt (positive electrode) 13 embedded in the insulator 133 can reduce the size of the vehicle battery 1 in a height direction (Z axis direction).

The terminal fixing face 132b of the connecting member (positive electrode) 132 is mounted on the terminal supporting portion 133b of the insulator 133. The terminal supporting portion 133b has an insulator opening portion 133c formed therein. The insulator opening portion 133c is positioned to coincide with the swaged hole portion 132b1 of the terminal fixing face 132b when viewed from the Z axis direction. The terminal supporting portion 133b has an outer wall portion 133d formed thereon and surrounding the outer periphery of the terminal fixing face 132b. The terminal fixing face 132b abuts on the outer wall portion 133d to suppress the horizontal movement of the terminal fixing face 132b. This can prevent contact between the terminal fixing face 132b and the lid component 11 from causing a short circuit in the vehicle battery 1. The insulator 133 has a pair of protruding portions 133e at its lower end portion, and the protruding portions 133e are formed at a predetermined interval in the Y axis direction.

The insulator 133 has a raised portion 133f formed thereon in an area opposite to the recessed portion 132e of the terminal fixing face 132b. The raised portion 133f extends toward the inside of the recessed portion 132e. A clearance is provided between the raised portion 133f and the recessed portion 132e.

The lid component 11 has a gas discharge valve 11d formed substantially at the center in the Y axis direction. The gas discharge valve 11d is a break-type valve formed by reducing the thickness of the lid component 11 and is broken when the internal pressure of the battery case 10 reaches the operating pressure under abnormal conditions. This can prevent a pressure increase in the battery case 10. The lid component 11 has an electrolyte solution injecting port 11e formed between the gas discharge valve 11d and the terminal bolt (positive electrode) 13, and the electrolytic solution is injected into the battery case 10 through the electrolytic solution injecting port 11e.

The insulator 133 is fixed to one end of the lid component 11 in the Y axis direction. The lid component 11 has a first insulator-rotation preventing portion 11a and a second insulator-rotation preventing portion 11b formed thereon. The first insulator-rotation preventing portion 11a is formed to surround the outer face of the seat housing portion 133a of the insulator 133. When a rotational force is applied to the insulator 133 in the X-Y plane, the outer face of the seat housing portion 133a can abut on the inner face of the first insulator-rotation preventing portion 11a to prevent the rotation of the insulator 133.

The second insulator-rotation preventing portion 11b is formed to extend in the Y axis direction substantially at the center of the first insulator-rotation preventing portion 11a. One of the protruding portions 133e of the insulator 133 abuts on one end face of the second insulator-rotation preventing portion 11b in the Y axis direction, and the other protruding portion 133e abuts on the other end face of the second insulator-rotation preventing portion 11b in the Y axis direction. When a rotational force is applied to the insulator 133 in the X-Y plane, the outer face of the protruding portion 133e can abut on the inner face of the second insulator-rotation preventing portion 11b to prevent the rotation of the insulator 133 more effectively.

The first insulator-rotation preventing portion 11a is formed by depressing part of the lid component 11 toward the inside of the battery case 10. This places the terminal bolt (positive electrode) 13 in an area closer to the battery case 10, so that the size of the vehicle battery 1 can be reduced in the Z axis direction.

The lid component 11 has a lid component through hole 11c formed therein. The lid component through hole 11c is provided at a position coinciding with the insulator opening portion 133c of the insulator 133 when viewed from the Z axis direction.

A gasket (second gasket) 134 is interposed between the lid component 11 and the collector terminal (positive electrode) 131. The gasket 134 has a peripheral wall 134b formed on the outer periphery and surrounding a rivet supporting portion 131b of the collector terminal (positive electrode) 131. The gasket 134 is made of an insulating material. The insulating material may be rubber or resin. The gasket 134 has a gasket opening portion 134a formed therein to be in close contact with the rivet portion 131a formed on the collector terminal (positive electrode) 131. The rivet portion 131a in close contact with the gasket opening portion 134a can enhance the hermeticity of the battery case 10.

In the assembled vehicle battery 1, the rivet portion 131a is inserted into the gasket opening portion 134a, the lid component through hole 11c, the insulator opening portion 133c, and the swaged hole portion 132b1, and is swaged on the terminal fixing face 132b to expand in a diameter direction. This brings the terminal bolt (positive electrode) 13, the insulator 133, the collector terminal (positive electrode) 131, and the power-generating element 12 together. The structure of the terminal on the negative electrode side may be identical to or different from that on the positive electrode side.

Figure 4:
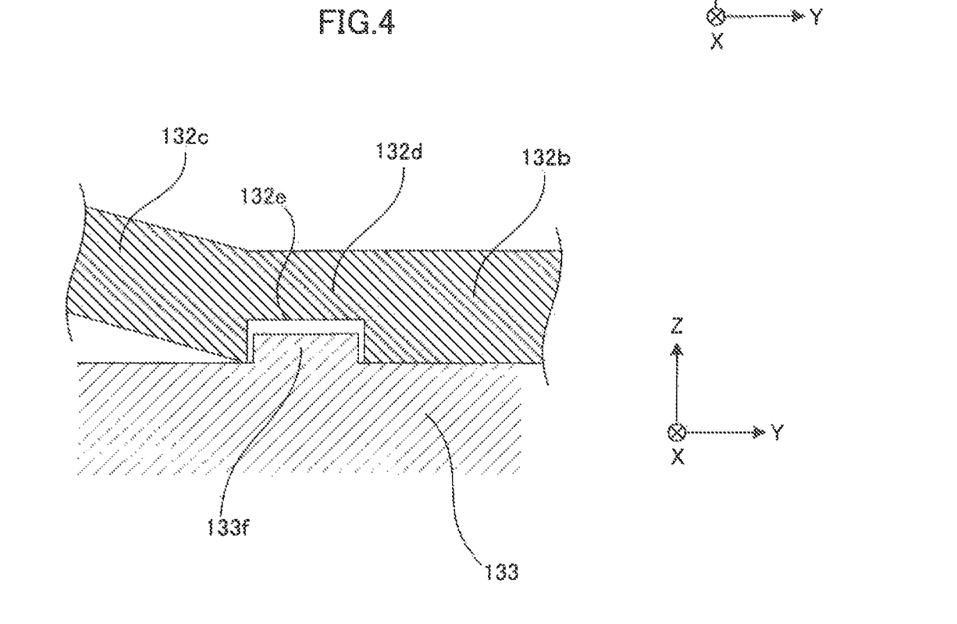
FIG. 4 is an enlarged view of a thinner portion of a connecting member (positive electrode) and its surroundings (before fastening).
Figure 5:
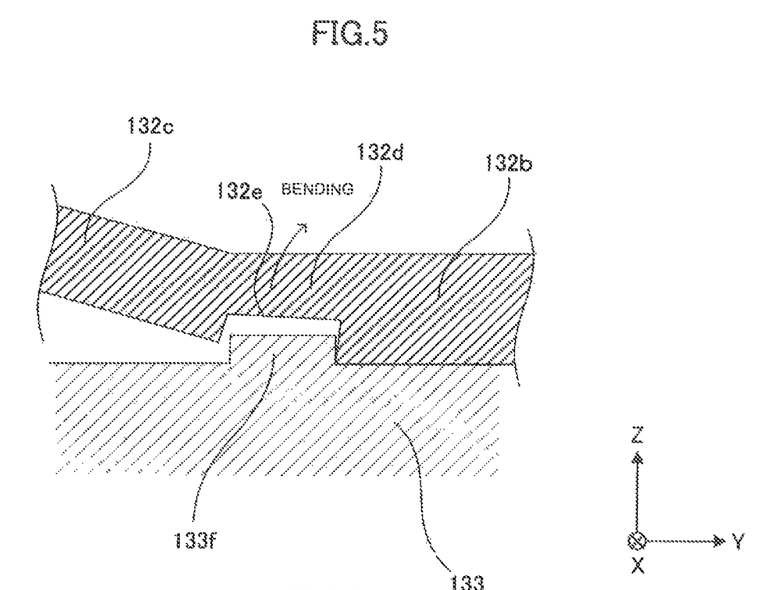
FIG. 5 is an enlarged view of the thinner portion of the connecting member (positive electrode) and its surroundings (after fastening).
Figure 6:
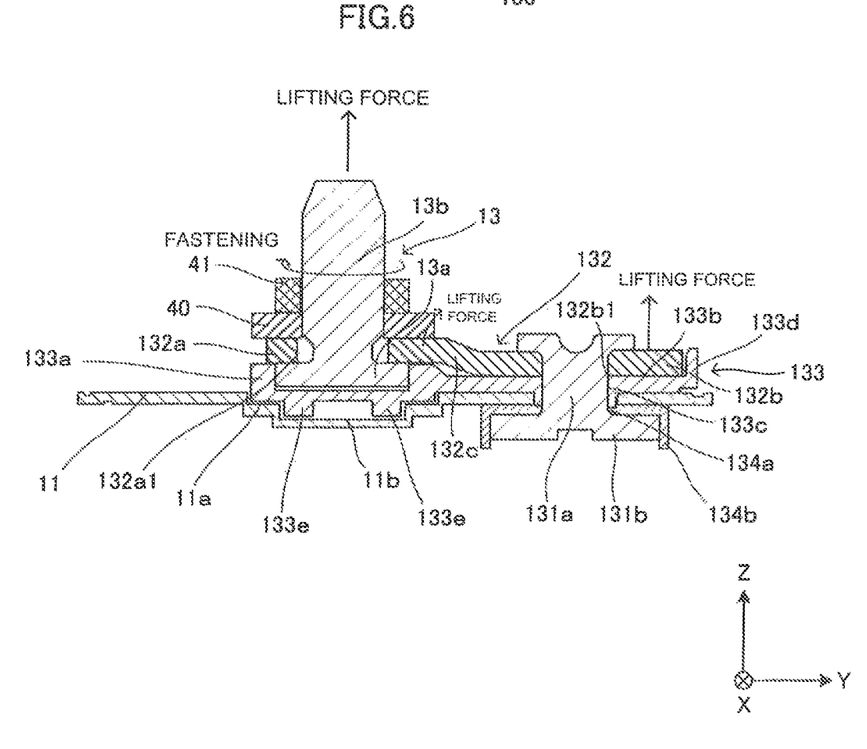
FIG. 6 is a section view of a battery in a comparative example.

Description is next made of the behavior of the connecting member (positive electrode) 132 bent in response to the application of an external force in the axis direction (Z axis direction) of the terminal bolt (positive electrode) 13 with reference to FIG. 3 to FIG. 6. FIG. 4 and FIG. 5 are enlarged views of the thinner portion of the connecting member (positive electrode) and its surroundings, wherein FIG. 4 shows the state before the external force is applied in the axis direction of the terminal bolt (positive electrode), and FIG. 5 shows the state after the external force is applied in the axis direction of the terminal bolt (positive electrode). FIG. 6 is a section view showing a battery in a comparative example and corresponds to FIG. 3. The comparative example differs from the configuration shown in FIG. 3 in that the thinner portion 132d and the raised portion 133f are omitted.

Referring to FIG. 6, when the fastening nut 41 is fastened to the terminal bolt (positive electrode) 13, the fastening force of the fastening nut 41 lifts the terminal bolt (positive electrode) 13 in the Z axis direction (a direction away from the lid component 11). When the terminal bolt (positive electrode) 13 is lifted in the Z axis direction, an external force is applied in a direction indicated by an arrow to the terminal fastening face 132a abutting on the seat portion 13a of the terminal bolt (positive electrode) 13, and an external force is applied to the terminal fixing face 132b in a direction lifting the rivet portion 131a. Thus, the configuration in the comparative example impairs the sealing of the battery case 10.

In contrast, in the configuration of the present embodiment, when the terminal bolt (positive electrode) 13 is lifted in the Z axis direction, the terminal fastening face 132a and the inclined flat plate portion 132c are largely bent in a direction indicated by an arrow from the thinner portion 132d as the starting point to absorb the external force (see FIG. 5), so that the lifting force transferred to the rivet portion 131a can be reduced. This can enhance the sealing of the battery case 10.

When the terminal bolt (positive electrode) 13 is lifted in the Z axis direction, the recessed portion 132e and the raised portion 133f abut on each other in the Y axis direction, and the thinner portion 132d can be bent with that abutting portion as the pivot. This can effectively reduce the lifting force transferred to the rivet portion 131a. Although the fastening force of the fastening nut 41 is used as an example of the external force applied to the terminal bolt (positive electrode) 13 in the axis direction in the present embodiment, the configuration of the present embodiment is effective for an external force from the bus bar 40 vibrating during the running of the vehicle.

REFERENCE EXAMPLE 1

Figure 7:
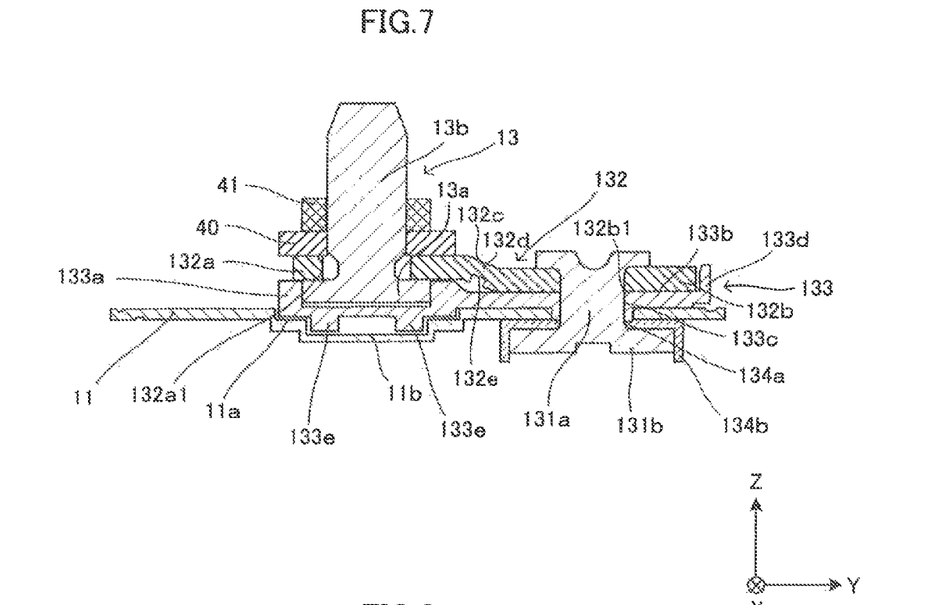
FIG. 7 is a section view of a connecting structure for a terminal bolt (positive electrode) and a power-generating element (Reference Example 1).

FIG. 7 is a section view of a connecting structure for a terminal bolt (positive electrode) and a power-generating element in Reference Example 1 and corresponds to FIG. 3. Components having the same functions as those of the components in Embodiment 1 are designated with the same reference numerals. Reference Example 1 differs from Embodiment 1 in the region where a thinner portion 132d and a recessed portion 132e are provided. Referring to FIG. 7, an inclined flat plate portion 132c has the thinner portion 132d formed thereon. The thinner portion 132d is provided by forming a recessed portion 132e in a face of the inclined flat plate portion 132c opposite to an insulator 133. According to the configuration of Reference Example 1, the same advantages as those in Embodiment 1 can be achieved.

REFERENCE EXAMPLE 2

Figure 8:
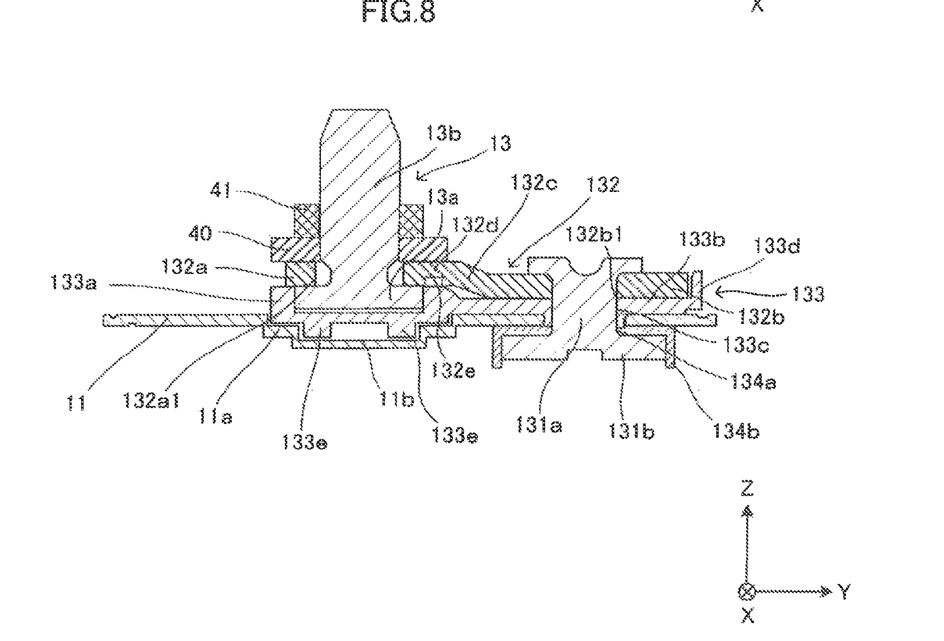
FIG. 8 is a section view of a connecting structure for a terminal bolt (positive electrode) and a power-generating element (Reference Example 2).

FIG. 8 is a section view of a connecting structure for a terminal bolt (positive electrode) and a power-generating element in Reference Example 2 and corresponds to FIG. 3 and FIG. 7. Components having the same functions as those of the components in Embodiment 1 are designated with the same reference numerals. Reference Example 2 differs from Reference Example 1 in the region where a thinner portion 132d and a recessed portion 132e are provided. Referring to FIG. 8, a terminal fastening face 132a has a thinner portion 132d formed thereon. The thinner portion 132d is provided by forming a recessed portion 132e in a face of the terminal fastening face 132a opposite to an insulator 133. According to the configuration of Reference Example 2, the same advantages as those in Embodiment 1 can be achieved.

Next, the superiority of Embodiment 1 over Reference Examples 1 and 2 are described. Referring to FIG. 7, when an external force in the axis direction is applied to a terminal bolt (positive electrode) 13, the highest stress is applied to the inclined flat plate portion 132c out of the terminal fastening face 132a, the inclined flat plate portion 132c, and the terminal fixing face 132b. According to the configuration of Embodiment 1, the thinner portion 132d is formed in the area receiving a lower stress than that in Reference Example 1, thereby making it possible to prevent a reduction in rigidity of the connecting member (positive electrode) 132. In addition, the recessed portion 132e can be formed more easily on the terminal fixing face 132c than on the inclined flat plate portion 132c. As a result, according to the configuration of Embodiment 1, higher manufacture efficiency can be achieved than in the configuration of Reference Example 1.

Referring to FIG. 8, when an external force in the axis direction is applied to the terminal bolt (positive electrode) 13, a heavy load is applied to the terminal fastening face 132a since the terminal fastening face 132a and a seat portion 13a of the terminal bolt (positive electrode) 13 overlap each other in the Z axis direction. When the thinner portion 132d is formed on the terminal fastening face 132a, the fastening force of a fastening nut 41 may buckle the terminal fastening face 132a. According to the configuration of Embodiment 1, the thinner portion 132d is formed on the terminal fixing face 132b not abutting on the terminal bolt (positive electrode) 13, so that the buckling of the terminal fastening face 132a can be prevented.

As shown in FIG. 4, the thinner portion 132d is preferably formed in the portion of the terminal fixing face 132b bordering on the inclined flat plate portion 132c. This can reduce the lifting force applied to the rivet portion 131a as compared with the configuration in which the thinner portion 132d is provided in the area closer to the rivet portion 131a.

(Modification 1)

Figure 9:
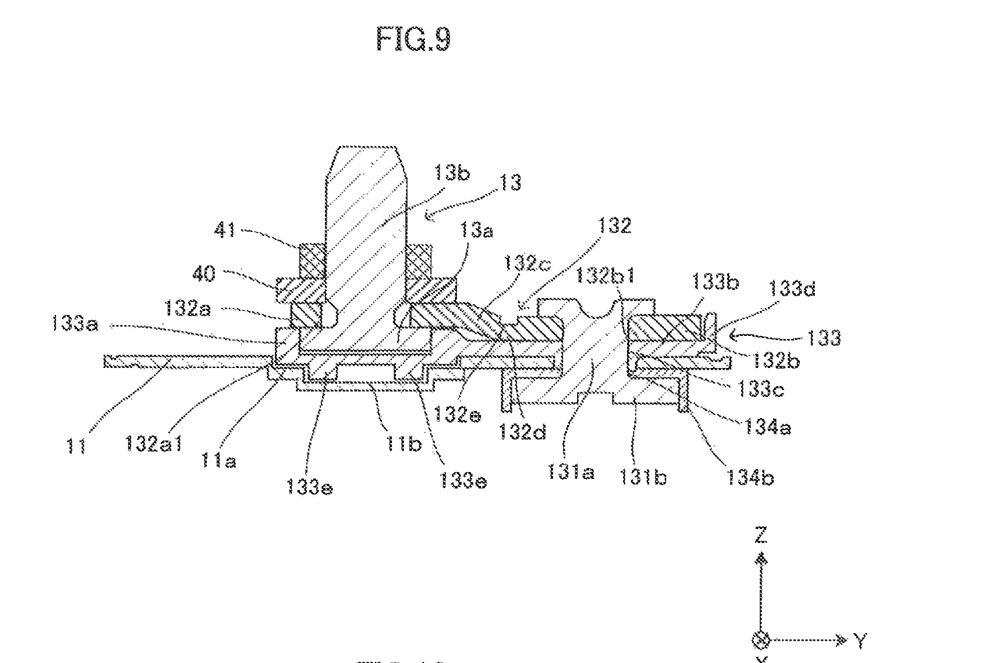
FIG. 9 is a section view of the connecting structure for the terminal bolt (positive electrode) and the power-generating element, showing a recessed portion provided ion an upper face of a terminal fixing face (Modification 1).
Figure 10:
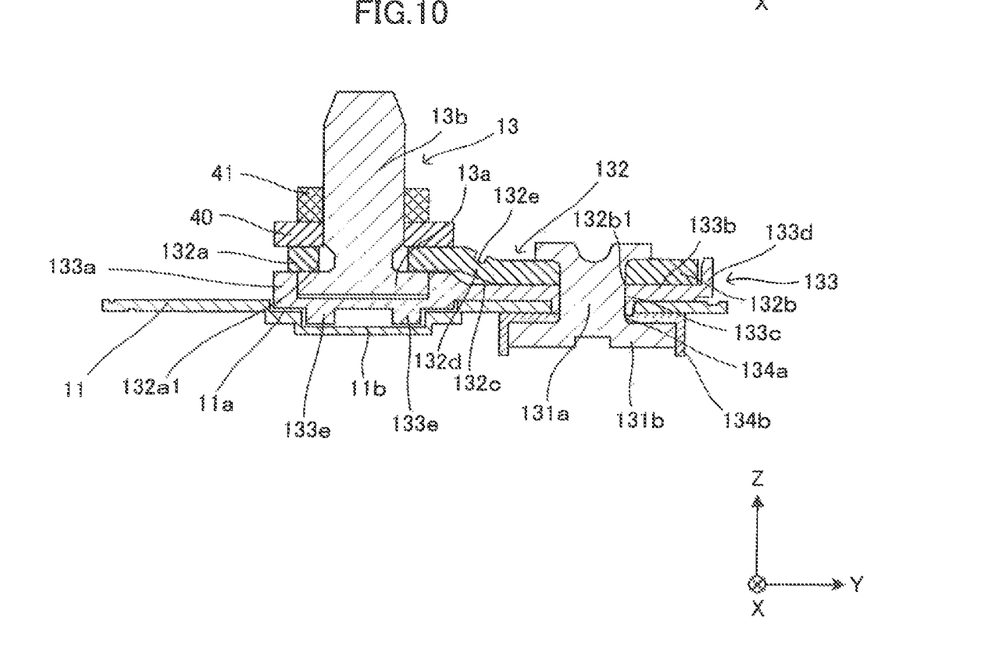
FIG. 10 is a section view of the connecting structure for the terminal bolt (positive electrode) and the power-generating element, showing the recessed portion provided in an upper face of an inclined flat plate portion.
Figure 11:
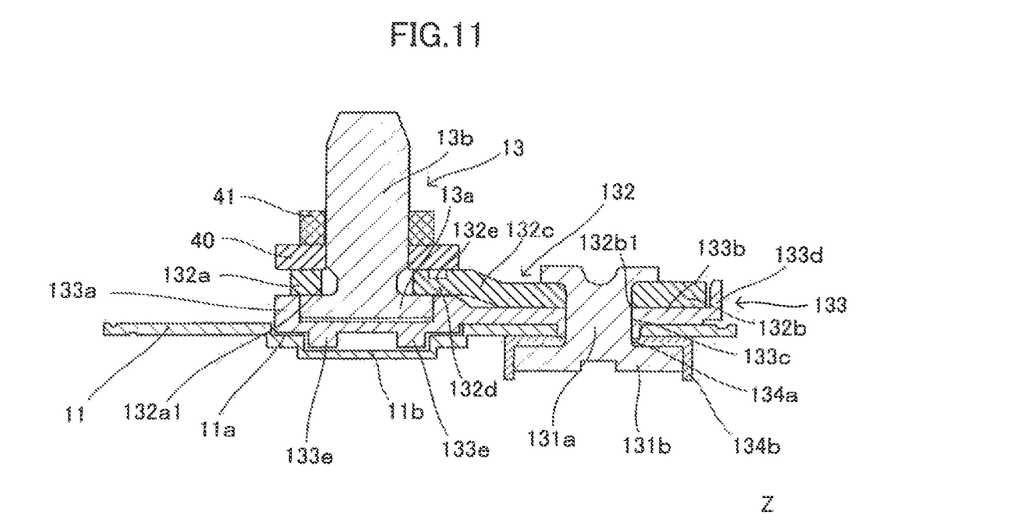
FIG. 11 is a section view of the connecting structure for the terminal bolt (positive electrode) and the power-generating element, showing the recessed portion provided in an upper face of a terminal fastening face.

Although each of the embodiments described above has the recessed portion 132e formed on the one of the outer faces of the connecting member (positive electrode) 132 that is opposite to the insulator 133, the present invention is not limited thereto. For example, the recessed portion 132e may be provided in an upper face of the terminal fixing face 132b (see FIG. 9). The recessed portion 132e in each of Reference Examples 1 and 2 may be provided in an upper face of the inclined flat plate portion 132c (see FIG. 10) and an upper face of the terminal fastening face 132a (see FIG. 11), respectively. When the recessed portion 132a is formed in the upper face of the terminal fastening face 132a, however, the area of contact (conducting area) between the bus bar 40 and the terminal fastening face 132a is reduced. According to the configuration of Reference Example 2, the recessed portion 132e is provided in the lower face of the terminal fastening face 132a, so that the area of contact between the bus bar 40 and the terminal fastening face 132a can be increased as compared with the configuration in which the recessed portion 132e is provided in the upper face.

REFERENCE EXAMPLE 3

Figure 12:
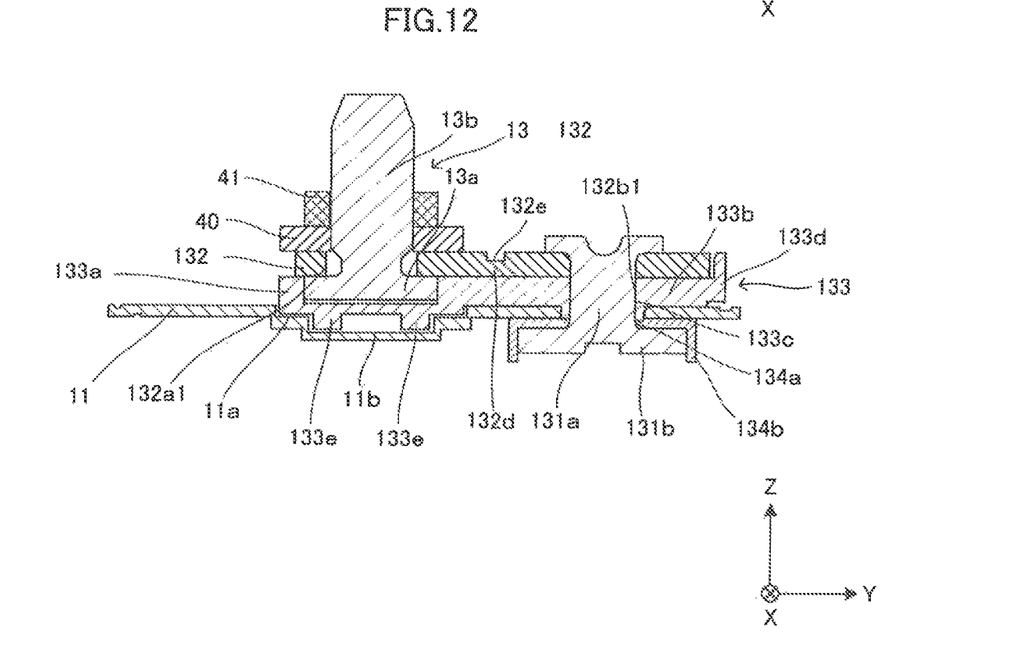
FIG. 12 is a section view of the connecting structure for the terminal bolt (positive electrode) and the power-generating element (Reference Example 3).

Although each of the embodiments described above has the connecting member (positive electrode) 132 formed in the stepped shape, the connecting member (positive electrode) 132 is formed in a straight shape in Reference Example 3 as shown in FIG. 12. In this case, the thinner portion 132d and the recessed portion 132e are formed at any region of the connecting member (positive electrode) 132. The thinner portion 132d and the recessed portion 132e may be provided at positions different from that of the seat portion 13a of the terminal bolt (positive electrode) 13 in the Y axis direction. The thinner portion 132d and the recessed portion 132e formed at the positions avoiding an external force applied by the seat portion 13a of the terminal bolt (positive electrode) 13 can suppress a reduction in rigidity of the connecting member (positive electrode) 132.

(Modification 3)

Figure 13:
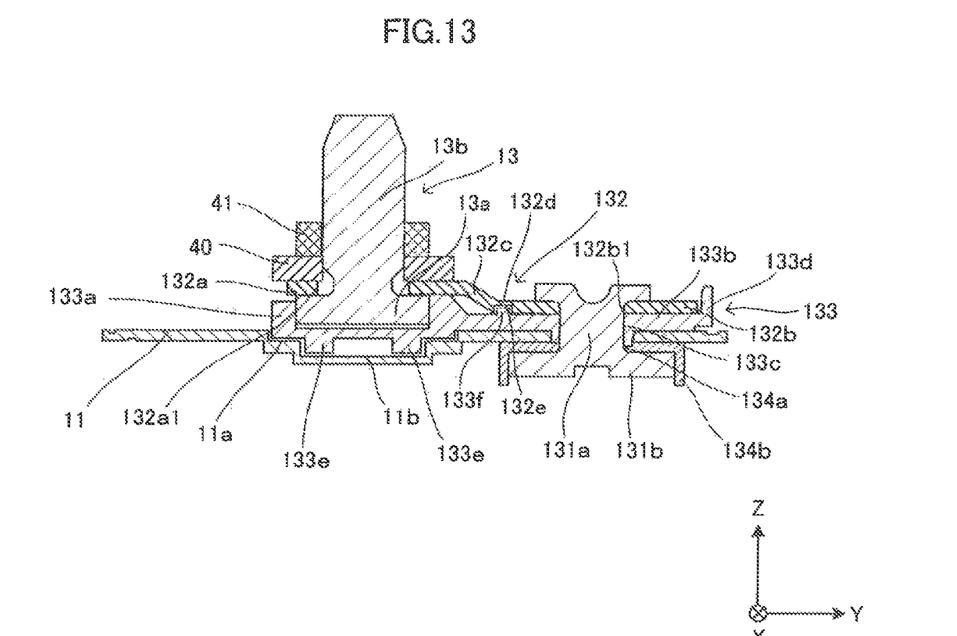
FIG. 13 is a section view of the connecting structure for the terminal bolt (positive electrode) and the power-generating element (Modification 3).

Although each of the embodiments described above has the terminal fastening face 132a and the terminal fixing face 132b having the overlapping areas in the horizontal direction, the present invention is not limited thereto. As shown in FIG. 13, the terminal fastening face 132a and the terminal fixing face 132b may be shaped not to overlap in the horizontal direction.

(Modification 4)

Figure 14:
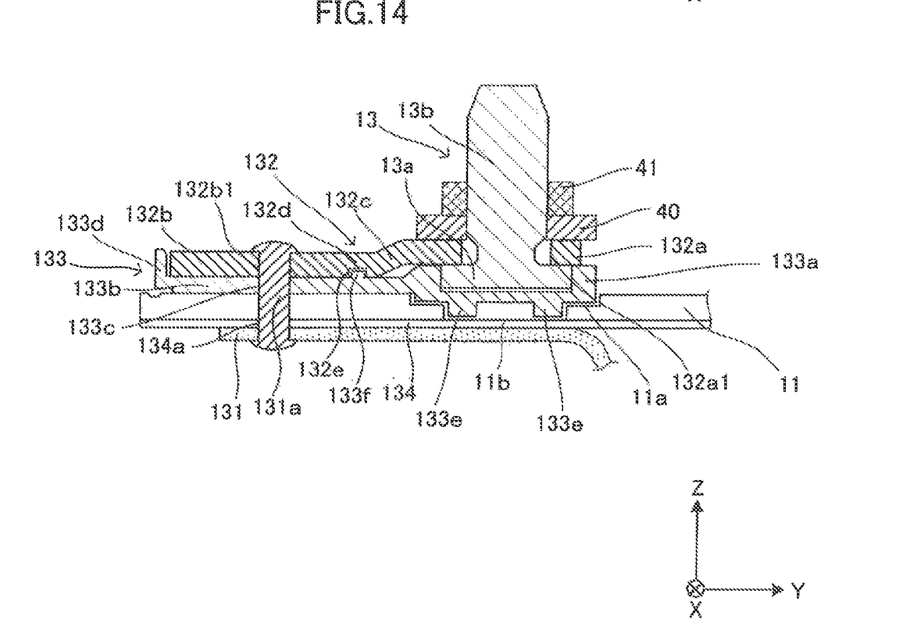
FIG. 14 is a section view of the connecting structure for the terminal bolt (positive electrode) and the power-generating element (Modification 4).

FIG. 14 is a section view of the connecting structure for the terminal bolt (positive electrode) and the power-generating element according to Modification 4. Components having the same functions as those of the components in the embodiments described above are designated with the same reference numerals. Referring to FIG. 14, the terminal bolt (positive electrode) 13 according to Modification 2 is provided at a position farther from the center of the vehicle battery 1 than the rivet portion 131a. An upper end portion of the rivet portion 131a is swaged on an upper face of the terminal fixing face 132b, and a lower end portion of the rivet portion 131a is swaged on the collector terminal (positive electrode) 131. The gasket 134 is interposed between the collector terminal (positive electrode) 131 and the lid component 11. The thinner portion 132d and the recessed portion 132e can be formed at the same regions as those in the embodiments and the modifications described above. In this manner, the present invention can be applied to a battery in which the connecting structure for connecting the connecting terminal 132 and the power-generating element 12 is different from that in the embodiments described above.

(Modification 5)

Although the vehicle body 1 is described in each of the embodiments described above, the present invention is not limited thereto and can be used for other applications. The other applications may include an electrically powered tool which vibrates in operation. The electrically power tool may be a lawn mower or a chain saw. Thus, the battery according to the present invention can be preferably mounted not only on the vehicle but also on various mounting devices vibrating in operation such as the lawn mower and the chain saw.

The invention claimed is:

1. A battery comprising:
   a bottomed case of box shape housing a power-generating element;
   a lid component for the case;
   a terminal electrode provided outside the case and extending in a direction of a thickness of the lid component;
   a take-out electrode passing through the lid component, provided for taking out an electric power of the power-generating element to the outside of the case, and disposed at a position different from that of the terminal electrode within a plane including the lid component; and
   a connecting member connecting the terminal electrode and the take-out electrode and including a recessed portion allowing bending of the connecting member in response to an external force applied to the terminal electrode in the direction of the thickness of the lid component,
   wherein the connecting member is formed in a stepped shape having a first flat plate portion connected to the terminal electrode and a second flat plate portion positioned at a height different from that of the first flat plate portion and connected to the take-out electrode, and the recessed portion is formed in the second flat plate portion,
   wherein the second flat plate portion includes a hole portion through which the take-out electrode passes, and the recessed portion is formed on a surface of the second flat plate portion at a position different from the hole portion of the second flat plate portion,
   wherein the battery further comprises an insulator sandwiched between the second flat plate portion and the lid component,
   wherein the insulator has a protruding portion that is inserted into the recessed portion,
   wherein the recessed portion is provided on a flat surface of the second flat plate portion that is in contact with the insulator, and
   wherein a clearance is provided between the recessed portion and the protruding portion.

2. The battery according to claim 1, wherein the connecting member has an inclined flat plate portion connecting the first flat plate portion and the second flat plate portion, and
the recessed portion is formed in a portion of the second flat plate portion, the portion bordering on the inclined flat plate portion.

3. The battery according to claim 1, wherein the terminal electrode is inserted into a bus bar, and
a nut for fixing the bus bar is fastened to an outer face of the terminal electrode.

4. The battery according to claim 1, further comprising:
a negative electrode terminal electrode made of copper; and
a positive electrode terminal electrode made of aluminum,
wherein the recessed portion is formed only in the positive electrode terminal electrode out of the positive electrode terminal electrode and the negative electrode terminal electrode.

5. An assembled battery provided by connecting a plurality of the batteries according to claim 1.

6. The assembled battery according to claim 5, wherein the assembled battery is a power source supplying a driving electric power for a motor used to run a vehicle.

7. The assembled battery according to claim 5, wherein the assembled battery is a power source for driving an electrically powered tool.

8. A mounting device having the assembled battery according to claim 5 mounted thereon.

* * * * *